United States Patent
Duyck et al.

(10) Patent No.: US 7,375,061 B2
(45) Date of Patent: May 20, 2008

(54) ANTIOXIDANT HYDRAZIDES AND DERIVATIVES THEREOF HAVING MULTIFUNCTIONAL ACTIVITY

(75) Inventors: Karl J. Duyck, Waterbury, CT (US); Theodore E. Nalesnik, Hopewell Junction, NY (US); Wadim Batorewicz, New Haven, CT (US)

(73) Assignee: Crompton Corporation, Middlebury, CT (US)

( * ) Notice: Subject to any disclaimer, the term of this patent is extended or adjusted under 35 U.S.C. 154(b) by 780 days.

(21) Appl. No.: 10/937,247

(22) Filed: Sep. 8, 2004

(65) Prior Publication Data

US 2006/0052260 A1    Mar. 9, 2006

(51) Int. Cl.
C10M 173/02    (2006.01)
C10L 1/22      (2006.01)

(52) U.S. Cl. .................................. 508/527; 508/452
(58) Field of Classification Search .......... 508/517, 508/452
See application file for complete search history.

(56) References Cited

U.S. PATENT DOCUMENTS

| | | | |
|---|---|---|---|
| 3,509,093 A | 4/1970 | Lehman et al. | |
| 3,928,497 A | 12/1975 | Ohmori et al. | 260/878 |
| 3,929,726 A | 12/1975 | Schollenberger et al. | |
| 4,089,794 A | 5/1978 | Engel et al. | 252/51.5 |
| 4,100,132 A | 7/1978 | Hill | 260/42.46 |
| 4,340,689 A | 7/1982 | Joffrion | 525/263 |
| 4,498,842 A | 2/1985 | Fischer et al. | 416/155 |
| 4,517,104 A | 5/1985 | Bloch et al. | 252/51.5 |
| 4,670,515 A | 6/1987 | Olivier | 525/285 |
| 4,693,838 A | 9/1987 | Varma et al. | 252/51.5 |
| 4,863,623 A | 9/1989 | Nalesnik | 252/50 |
| 4,990,274 A | 2/1991 | Nalesnik | 252/52 |
| 5,021,177 A | 6/1991 | Kapuscinski et al. | 252/51.5 |
| 5,075,383 A | 12/1991 | Migdal et al. | 525/293 |
| 5,094,766 A | 3/1992 | Kapuscinski et al. | 252/51.5 |
| 5,498,809 A | 3/1996 | Emert et al. | 585/13 |
| 5,556,923 A | 9/1996 | Caines et al. | 525/285 |
| 5,580,482 A * | 12/1996 | Chasan et al. | 508/243 |
| 6,162,768 A | 12/2000 | Coolbaugh et al. | 508/189 |
| 6,677,282 B2 | 1/2004 | Lange et al. | 508/452 |
| 2002/0035195 A1 | 3/2002 | Toratani et al. | |
| 2003/0030033 A1 | 2/2003 | Duyck et al. | 252/380 |
| 2004/0059037 A1* | 3/2004 | Wang et al. | 524/445 |
| 2004/0106724 A1 | 6/2004 | Toratani et al. | |
| 2006/0052260 A1* | 3/2006 | Duyck et al. | 508/527 |
| 2007/0015815 A1* | 1/2007 | Deloach | 514/419 |

FOREIGN PATENT DOCUMENTS

EP    0303280 A2    2/1989
EP    0922752 A2    12/1997
WO    03/025034 A1    9/2001

OTHER PUBLICATIONS

Nadia Ahmed Mohamed "Aromatic Hydrazides as Stabilizers for Rigid PVC Against Thermo-Oxidative Degradation" Data #XP-002347693. Appearing in Elsevier Science Limited. pp. 317-329 (1997).
Chan et al., Copper Deactivators for Polyolefin Insulation, Bell Laboratories, vol. 27, pp. 99-106, (1978).

* cited by examiner

Primary Examiner—Walter D. Griffin
Assistant Examiner—Francis C Campanell
(74) Attorney, Agent, or Firm—Jaimes Sher

(57) ABSTRACT

A composition of matter is disclosed wherein the composition comprises a hydrazide compound of the formula:

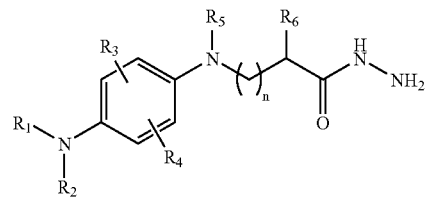

wherein:

$R_1$ is selected from the group consisting of alkyl, alkyl ether, and phenyl;

$R_2$, $R_3$, $R_4$, $R_5$, and $R_6$ are independently selected from the group consisting of hydrogen, alkyl, alkyl ether, and aryl; and n is an integer of from 0 to 10;
and wherein:

when $R_1$ is phenyl, it is of the structure:

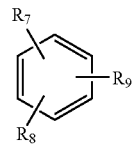

wherein $R_7$, $R_8$, and $R_9$ are independently selected from the group consisting of hydrogen, alkyl, alkyl ether, and aryl, or $R_7$ can be combined with $R_8$ to form a ring of 5 or 6 carbon atoms.

The hydrazides are useful as stabilizers for lubricants, greases, and polymeric systems, particularly lubricating oils, as are maleated polymers that have been functionalized with them.

4 Claims, No Drawings

ANTIOXIDANT HYDRAZIDES AND DERIVATIVES THEREOF HAVING MULTIFUNCTIONAL ACTIVITY

BACKGROUND OF THE INVENTION

1. Field of the Invention

This invention relates to the protection of organic materials, such as rubber, plastic, lubricating oils, petroleum fuels, waxes, organic liquids, and the like, from oxidation by the use of antioxidants that are hydrazides and derivatives thereof In a preferred embodiment, the present invention is directed to lubricants, especially lubricating oils. More particularly, the invention relates to a class of dispersant additives having antioxidant and viscosity index improving credit that are preferably derived from an ethylene-propylene diene modified terpolymer (EPDM) or an ethylene-propylene copolymer and a hydrazide or hydrazide derivative.

2. Description of Related Art

Organic materials such as rubber, plastic, lubricating oils, petroleum fuels, waxes, and organic liquids are well known to need protection from oxidation.

Currently, many of these organic materials are being exposed to higher operating temperatures and mechanical shear. New stabilizers that can protect organic materials from premature oxidation and degradation under these advanced operating conditions are being sought.

Further, in developing lubricating oils, there have been many attempts to provide additives that provide a lubricating oil with dispersancy of sludge and soot as well as high temperature deposit control. In addition, the formulation of an oil to meet high and low temperature viscosity requirements is critical and, in most cases, a viscosity index improver is employed to achieve this goal. Most multifunctional additives of the prior art provide one or two of these features.

It is well-known that internal combustion engines operate under a wide range of temperatures, including low temperature stop-and-go driving service, as well as high-temperature conditions produced by continuous high speed driving. Stop-and-go driving, particularly under cold, damp weather conditions, leads to the formation of sludge in the crankcase and in the oil passages of a gasoline or a diesel engine. This sludge seriously limits the ability of the crankcase engine oil to lubricate the engine effectively. In addition, the sludge, with its entrapped water, tends to contribute to rust formation in the engine. These problems can be aggravated by engine manufacturers' lubrication service recommendations, which typically specify extended oil drain intervals.

The polymers utilized in this invention can be obtained by a variety of methods known in the art. Such art can be represented by, but is not limited to, the following.

U.S. Pat. No. 3,928,497 discloses a process for preparing a graft-modified ethylene polymer or copolymer with a dicarboxylic acid graft-copolymerizable therewith or its graft-copolymerizable derivative in an alkyl-substituted aromatic hydrocarbon solvent in the presence of a radical initiator, characterized in that the reaction is performed while adding the dicarboxylic acid or its derivative gradually to the solvent in which the starting ethylene polymer or copolymer is present.

U.S. Pat. No. 4,517,104 discloses oil soluble viscosity index improving ethylene copolymers, such as copolymers of ethylene and propylene; and ethylene, propylene and diolefin; etc., that are reacted or grafted with ethylenically unsaturated carboxylic acid moieties, preferably maleic anhydride moieties, and reacted with polyamines having two or more primary amine groups and a carboxylic acid component, preferably alkylene polyamine and alkenyl succinic anhydride, such as polyisobutenyl succinic anhydride. Or the grafted ethylene copolymer can be reacted with already formed salts, amides, imides, etc. of the polyamine and acid component, preferably imides of alkylene polyamine and alkenyl succinic anhydride. It is said that these reactions can permit the incorporation of varnish inhibition and dispersancy into the ethylene copolymer while inhibiting cross-linking with resulting viscosity increase, haze or gelling. The grafting reaction may be carried out thermally, or more preferably with a free radical initiator, such as a peroxide in a mineral lubricating oil, in which case the acid component, preferably also acts to solubilize insoluble compounds formed by side reactions, such as maleic anhydride grafted oil molecules reacted with amine, to thereby inhibit haze formation, particularly when preparing oil concentrates of the V.I.-dispersant additive for later addition to lubricating oils. Preferred methods of grafting maleic anhydride onto the ethylene copolymer by periodic or continuous addition of maleic anhydride and initiator charge, so as to maintain the maleic anhydride in solution during the grafting reaction are also disclosed.

U.S. Pat. No. 4,693,838 discloses the reaction of hydrocarbon polymers, such as ethylene copolymers, with unsaturated nitrogen-containing monomers or unsaturated carboxylic acids in a synthetic hydrocarbon lubricating oil in the presence of a free radical initiator, such as a peroxide. The copolymer grafted directly with the nitrogen-containing monomers may be utilized as an additive for oil compositions, particularly lubricating oil compositions as a V.I.-dispersant additive. The polymer reacted with carboxylic acid may be further reacted with amines or amino-alcohols to also form a multifunctional V.I.-dispersant additive.

U.S. Pat. No. 4,340,689 discloses a process for grafting functional organic groups onto EPM and EPDM polymers wherein the grafting reaction is carried out in the cement in which the polymer is originally formed by solution polymerization.

U.S. Pat. No. 6,162,768 discloses dispersants and dispersant viscosity index improvers which include polymers of conjugated dienes which have been hydrogenated, functionalized, optionally modified and post treated. The dispersant substances include a copolymer of two different conjugated dienes. The polymers are selectively hydrogenated to produce polymers which have highly controlled amounts of unsaturation, permitting highly selective functionalization. The polymers may be functionalized by grafting of heteroatom-containing olefins. Also provided are lubricant fluids, such as mineral and synthetic oils, which have been modified in their dispersancy and/or viscometric properties by means of the dispersant substances. Also provided are methods of modifying the dispersancy and/or viscometric properties of lubricating fluids such as mineral and synthetic lubricating oils. The dispersant substances may also include a carrier fluid to provide dispersant concentrates.

U.S. Pat. No. 6,677,282 discloses hydrocarbyl substituted carboxylic compositions and derivatives thereof that are said to be useful as dispersant/viscosity improvers for lubricating oil and fuel compositions. Carboxylic compositions are derived from (A) a hydrocarbon polymer having $M_n$ ranging from about 20,000 to about 500,000, and (B) an $\alpha,\beta$-unsaturated carboxylic compound prepared by reacting (1) an active methylene compound of a formula (I), and (2) a carbonyl compound of a general formula (II), and lower alkyl acetals, ketals, hemiacetals and hemiketals of the carbonyl compound (2). Carboxylic derivative compositions are obtained by reacting the carboxylic compositions with a reactant selected from the group consisting of (a) amines characterized by the presence within their structure of at least one condensable H—N<group, (b) alcohols, (c) reactive metal or reactive metal compounds, and (d) a combination of two or more of any of (a) through (c), the components of (d) being reacted with the carboxylic composition simultaneously or sequentially, in any order.

U.S. patent application Publication No. 2003/0030033 discloses a composition comprising an N-aromatic substituted acid amide compound selected from the group consisting of compounds of a specified formula (I). These compositions may be used as such or they may be bound to a polymer backbone via a linking moiety. In either case, they are useful as antioxidants, particularly in lubricating oil compositions.

WO 03/025034 discloses a process that comprises solution grafting a hydrocarbon polymer prepared from at least one $C_2$ to $C_{28}$ polymerizable hydrocarbon, said polymer having a number average molecular weight in the range of from about 5,000 to about 500,000 with an ethylenically unsaturated $C_3$ to $C_{10}$ carboxylic acid material, using a free radical initiator in the presence of a structurally defined ester oil.

Metal deactivators for polyolefins based on hydrazides are also known in the art, e.g., *Copper Deactivators For Polyolefin Insulation*, Chan, M. G. et al., Bell Lab., Murray Hill, N.J., USA. *Proceedings of International Wire and Cable Symposium* 27:99-106 (1978); and U.S. Pat. No. 4,100,132, which discloses certain imido-oxamide-type compounds and derivatives thereof which are useful for preventing metal catalyzed oxidative degradation of polyolefins. The specification also relates to olefin homopolymer and copolymer compositions containing such compounds and derivatives thereof and to a method for enhancing the resistance of olefin homopolymers and copolymers against metal-catalyzed oxidative degradation by incorporating these compounds therein.

These references describe imido-oxamide-type compounds and derivatives thereof, which are useful for preventing metal catalyzed oxidative degradation of polyolefins. The disclosed structure is below:

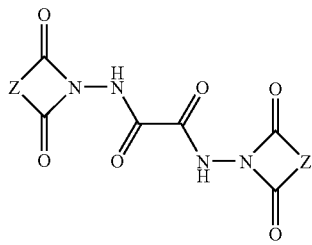

wherein Z is a bivalent radical which together with the dicarboximide group forms a monocyclic or polycyclic ring system and is selected from the group consisting of phenylene, cyclohexylene, cyclohexenylene, cyclohexenylene substituted by a methyl group, norbornenylene, ethylene, vinylene and tetradecenylene.

These compounds are effective in deactivating metals in plastic materials, but are limited by two factors: (1) they do not exhibit any primary antioxidant performance on their own, and (2) they are substantially insoluble in oil.

It is an object of the present invention to address both of these issues around hydrazide metal deactivators, either by providing metal deactivation (MD) activity as an oil soluble additive or MD/antioxidant activity as an oil soluble additive. Another objective is to provide hydrazide monomers that provide antioxidant performance.

The disclosures of the foregoing are incorporated herein by reference in their entirety.

SUMMARY OF THE INVENTION

These and other objects, which will be apparent to those skilled in the art, are provided by the present invention, which is directed to hydrazide compounds of the formula:

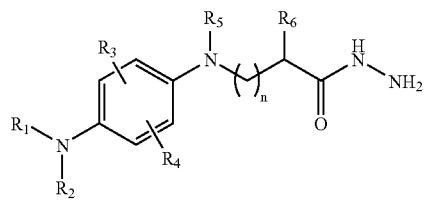

wherein:

$R_1$ is selected from the group consisting of alkyl, alkyl ether, and phenyl;

$R_2$, $R_3$, $R_4$, $R_5$, and $R_6$ are independently selected from the group consisting of hydrogen, alkyl, alkyl ether, and aryl; and n is an integer of from 0 to 10;

and wherein:

when $R_1$ is phenyl, it is of the structure:

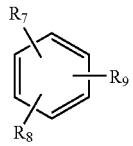

wherein $R_7$, $R_8$, and $R_9$ are independently selected from the group consisting of hydrogen, alkyl, alkyl ether, and aryl, or $R_7$ can be combined with $R_8$ to form a ring of 5 or 6 carbon atoms.

It is expected that the compounds of the present invention will have useful antioxidant properties for use as antioxidants in compounded tires, polyols, plastics, urethanes, greases, motor oils, rubber belts, cables, gaskets, seals, rubber products in the garment and carpet industries, and the like.

These antioxidants or other hydrazide compounds of the structure:

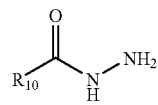

wherein $R_{10}$ is selected from the group consisting of alkyl, alkyl ether, aryl, and heterocyclic, and may contain groups or linkages of oxygen, nitrogen, sulfur, or combinations thereof, in addition to any carbon/hydrogen backbone, are also expected to be useful for products that require antioxidants or metal deactivators bound to polymers through polymer bound linkage groups, such as succinic or maleic anhydride, carboxylic acids or esters, and epoxides to prevent antioxidant blooming from the substrate or for polymer property improvement. Examples of products which may use polymer bound antioxidants are automotive tires, beverage bottles, and automotive motor oil polymer additives, such as dispersants and viscosity index (V.I.) improvers (particularly those based on or equivalent to European patent application 98310091.8 and U.S. Pat. Nos. 5,075,383 and 4,863,623, and Patent Application Publication No. 2003/0030033, substituting these new hydrazides for N-phenylphenylenediamine, or N-(4-anilinophenyl)-3-aminobutanamide). With respect to dispersants, the use of co-solvents to control product viscosity and use in manufacture processes, outlined in U.S. Pat. Nos. 4,990,274; 5,556,923, and WO 03/025034 may also be employed with these new derivatizing antioxidant hydrazides.

The polymer bound hydrazides described above are expected to be useful as a multifunctional V.I.-dispersant additives, with antioxidant and metal deactivator activity, for oil compositions, particularly lubricating oil compositions as a V.I.-dispersant additive in spark ignition engines (PCMO) and compression ignition engines (diesel) with or without exhaust gas recycle equipment.

An example of one structure of such a polymer bound hydrazide would be:

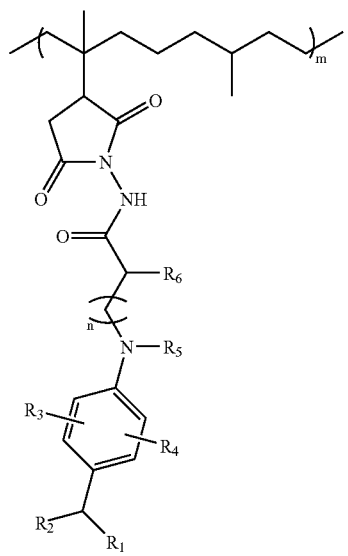

where m is 1 to 6 units per polymer chain.

More particularly, the present invention is directed to a composition of matter comprising a hydrazide compound of the formula:

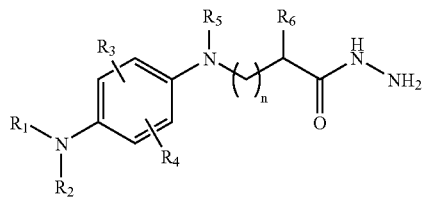

wherein:
R$_1$ is selected from the group consisting of alkyl, alkyl ether, and phenyl;
R$_2$, R$_3$, R$_4$, R$_5$, and R$_6$ are independently selected from the group consisting of hydrogen, alkyl, alkyl ether, and aryl; and
n is an integer of from 0 to 10;
and wherein:
when R$_1$ is phenyl, it is of the structure:

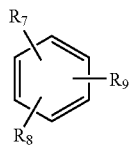

wherein R$_7$, R$_8$, and R$_9$ are independently selected from the group consisting of hydrogen, alkyl, alkyl ether, and aryl, or R$_7$ can be combined with R$_8$ to form a ring of 5 or 6 carbon atoms.

In another aspect, the present invention is directed to the use of the above-described hydrazide compounds as stabilizers for lubricants, e.g., lubricating oils, greases, and polymeric systems such as rubber, plastic polyols, and the like.

In another aspect, the present invention is directed to hydrazide molecules based on the functionalization of maleated polymers (EP or otherwise) with the above-described hydrazide compounds.

In another aspect, the present invention is directed to hydrazide molecules based on the functionalization of maleated polymers with the above-described hydrazide compounds as dispersants, viscosity index improvers, antioxidants, and metal deactivators in lubricating oils (passenger car motor oil, heavy duty diesel, or heavy duty diesel equipped with exhaust gas recycle).

In another aspect, the present invention is directed to the use of hydrazide molecules based on the functionalization of maleated polymers with the above-described hydrazide compounds as stabilizers in polymeric systems, such as rubbers, plastics, and polyols.

In another aspect, the present invention is directed to hydrazide molecules based on the functionalization of maleated polymers (EP or otherwise) with hydrazide monomers of the following structure:

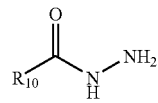

wherein $R_{10}$ is selected from the group consisting of alkyl, alkyl ether, aryl, and heterocyclic, and may contain groups or linkages of oxygen, nitrogen, sulfur, or combinations thereof, in addition to any carbon/hydrogen backbone.

In another aspect, the present invention is directed to the use of the hydrazide molecules described immediately above as VI improvers and metal deactivators in lubricating oils (PCMO, HDDD, HDD equipped with EGR).

In still another aspect, the present invention is directed to the use of the hydrazide molecules described immediately above as stabilizers in polymeric systems such as rubber, plastic, and polyols.

It is noted here that any use of the term "alkyl" in the context of a starting material or the final compounds of this invention is deemed to include linear or branched hydrocarbon chain, cycloalkyl and alkyl substituted cycloalkyl structures as well; for example, cyclopentyl, cyclohexyl, 4-methylcyclohexyl, and the like.

DESCRIPTION OF THE PREFERRED EMBODIMENTS

As disclosed above, in a preferred embodiment, the present invention is directed to a composition of matter comprising a hydrazide compound of the formula:

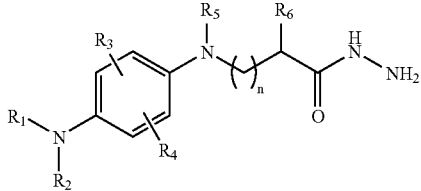

wherein:

$R_1$ is selected from the group consisting of alkyl, alkyl ether, and phenyl;

$R_2$, $R_3$, $R_4$, $R_5$, and $R_6$ are independently selected from the group consisting of hydrogen, alkyl, alkyl ether, and aryl; and n is an integer of from 0 to 10;

and wherein:

when $R_1$ is phenyl, it is of the structure:

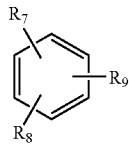

wherein $R_7$, $R_8$, and $R_9$ are independently selected from the group consisting of hydrogen, alkyl, alkyl ether, and aryl, or $R_7$ can be combined with $R_8$ to form a ring of 5 or 6 carbon atoms.

In the above structural formulae, where any of $R_1$ through $R_{10}$ is alkyl or alkyl ether, it is preferably alkyl or alkyl ether of from 1 to 22 carbon atoms, e.g., methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, uneicosyl, doeicosyl, methoxy, ethoxy, propoxy, butoxy, pentoxy, hexoxy, heptoxy, octoxy, nonoxy, decoxy, undecoxy, dodecoxy, tridecoxy, tetradecoxy, pentadecoxy, hexadecoxy, heptadecoxy, octadecoxy, nonadecoxy, eicosoxy, uneicosoxy, doeicosoxy, or isomers thereof, for example, isopropyl, isobutyl, sec-butyl, tert-butyl, 2-ethylhexyl, isopropoxy, isobutoxy, sec-butoxy, tert-butoxy, 2-ethylhexoxy, and the like. It is more preferred that where any of $R_1$ through $R_{10}$ is alkyl or alkyl ether, it is alkyl or alkyl ether of from 1 to 22 carbon atoms, most preferred that it be of from 1 to 12 carbon atoms.

As pointed out above, the compounds of the present invention can be used as such or can be reacted with a carboxylic acid material bound to a substantially linear polymer, copolymer, or terpolymer. The polymer backbone can be prepared from ethylene and propylene or it can be prepared from ethylene and at least one higher olefin within the range of $C_3$ to $C_{23}$ alpha-olefins.

Other alpha-olefins suitable in place of propylene to form the copolymer or to be used in combination with ethylene and propylene to form a terpolymer include 1-butene, 1-pentene, 1-hexene, 1-octene, and styrene; α,ω-diolefins, such as 1,5-hexadiene, 1,6-heptadiene, 1,7-octadiene; branched chain α-olefins, such as 4-methylbutene-1,5-methylpentene-1, and 6-methylheptene-1; and mixtures thereof More complex polymer substrates, often designated as interpolymers, may be prepared using a third component. The third component generally used to prepare an interpolymers substrate is a polyene monomer selected from non-conjugated dienes and trienes. The-non-conjugated diene component is one having from 5 to 14 carbon atoms in the chain. Preferably, the diene monomer is characterized by the presence of a vinyl group in its structure and can include cyclic and bicyclo compounds. Representative dienes include 1,4-hexadiene, 1,4-cyclohexadiene, dicyclopentadiene, 5-ethylidene-2-norbornene, 5-methylene-2-norbornene, 1,5-heptadiene, and 1,6-octadiene. A mixture of more than one diene can be used in the preparation of the interpolymer. A preferred non-conjugated diene for preparing a terpolymer or interpolymer substrate is 1,4-hexadiene.

The triene component will have at least two non-conjugated double bonds, and up to about 30 carbon atoms in the chain. Typical trienes useful in preparing the interpolymer of the invention are 1-isopropylidene-3α,4,7,7α-tetrahydroindene 1-isopropylidenedicyclopentadiene, dihydro-isodicyclopentadiene, and 2-(2-methylene-4-methyl-3-pentenyl)[2.2.1]bicyclo-5-heptene.

Ethylene-propylene or higher alpha-olefin copolymers may consist of from about 15 to about 80 mole percent ethylene and from about 85 to about 20 mole percent $C_3$ to $C_{23}$ α-olefin with the preferred mole ratios being from about 35 to 75 mole percent ethylene and from about 65 to 25 mole percent of the $C_3$ to $C_{23}$ α-olefin, with the more preferred proportions being from 50 to 70 mole percent ethylene and 50 to 30 mole percent of the $C_3$ to $C_{23}$ α-olefin, and the most preferred proportions being from 55 to 65 mole percent ethylene and 45 to 35 mole percent of the $C_3$ to $C_{23}$ α-olefin.

Terpolymer variations of the foregoing polymers can contain from about 0.1 to about 10 mole percent of a non-conjugated diene or triene.

The ethylene copolymer or terpolymer substrate is an oil-soluble, linear or branched polymer having a number average molecular weight of from about 2,000 to about 150,000 as determined by gel permeation chromatography and universal calibration standardization, with a preferred number average molecular weight range of 20,000 to 110,000.

The terms polymer and copolymer are used generically to encompass ethylene copolymers, terpolymers, or interpolymers. These materials can contain minor amounts of other olefinic monomers provided the basic characteristics of the ethylene copolymers are not materially changed.

The polymerization reaction used to form the ethylene-olefin copolymer substrate is generally carried out in the presence of a conventional Ziegler-Natta or metallocene catalyst system. The polymerization medium is not specific and can include solution, slurry, or gas phase processes, all known to those skilled in the art. When solution polymerization is employed, the solvent may be any suitable inert hydrocarbon solvent that is liquid under reaction conditions for polymerization of α-olefins. Examples of satisfactory hydrocarbon solvents include straight chain paraffins having from 5 to 8 carbon atoms, with hexane being preferred. Aromatic hydrocarbons, preferably aromatic hydrocarbons having a single benzene nucleus, such as benzene, toluene, and the like, and saturated cyclic hydrocarbons having boiling point ranges approximating those of the straight chain paraffinic hydrocarbons and aromatic hydrocarbons, described above, are particularly suitable. The solvent selected can be a mixture of one or more of the foregoing hydrocarbons. When slurry polymerization is employed, the liquid phase for polymerization is preferably liquid propylene. It is desirable that the polymerization medium be free of substances that will interfere with the catalyst components.

Next, an ethylenically unsaturated carboxylic acid material is grafted onto the prescribed polymer backbone to form an acylated ethylene copolymer. Those materials suitable for grafting onto the backbone contain at least one ethylenic bond and at least one, preferably two, carboxylic acid or its anhydride groups, or a polar group that is convertible into a carboxyl group by oxidation or hydrolysis. Preferably, the carboxylic acid reactants are selected from the group consisting of acrylic, methacrylic, cinnamic, crotonic, maleic, fumaric, and itaconic reactants. More preferably, the carboxylic reactants are selected from the group consisting of maleic acid, fumaric acid, maleic anhydride, and mixtures thereof. Maleic anhydride or a derivative thereof is generally most preferred owing to its commercial availability and ease of reaction. In the case of unsaturated ethylene copolymers or terpolymers, itaconic acid or its anhydride is preferred owing to its reduced tendency to form a cross-linked structure during the free-radical grafting process.

The ethylenically unsaturated carboxylic acid materials typically can provide one or two carboxylic groups per mole of reactant to the grafted polymer. For example, methyl methacrylate can provide one carboxylic group per molecule to the grafted polymer, while maleic anhydride can provide two.

The carboxylic reactant is grafted onto the prescribed polymer backbone in an amount to provide from about 0.05 to about 0.4 carboxylic groups per 1000 number average molecular weight units of the polymer backbone, preferably from about 0.1 to about 0.3 carboxylic groups per 1000 number average molecular weight. For example, a copolymer substrate with an $M_n$ of 20,000 would be grafted with from about 6 to about 15 carboxylic groups per polymer chain, or from about 3 to about 7.5 moles of maleic anhydride per mole of polymer, whereas a copolymer having an $M_n$ of 100,000 would be grafted with from about 30 to about 75 carboxylic groups per polymer chain, or from about 15 to about 37.5 moles of maleic anhydride per polymer chain. The minimum level of functionality is the level needed to achieve the minimum satisfactory dispersancy performance. Above the maximum functionality level little, if any, additional dispersancy performance is noted and other properties of the additive may be adversely affected.

The grafting reaction to form the acylated olefin copolymers is (generally carried out using a free-radical initiator either in solution or in bulk, as in an extruder or intensive mixing device. When the polymerization is carried out in hexane solution, it is economically convenient to carry out the grafting reaction as described in U.S. Pat. Nos. 4,340,689; 4,670,515; and 4,948,842, incorporated herein by reference. The resulting polymer intermediate is characterized by having carboxylic acid acylating functionality randomly distributed throughout its structure.

In the bulk process for forming the acylated olefin copolymers, one feeds the olefin copolymer to rubber or plastic processing equipment, such as an extruder or an intensive mixer or masticator, heats to a temperature of about 150° to about 400° C., and co-feeds the ethylenically unsaturated carboxylic acid reagent and free-radical initiator to the molten polymer to effect grafting. Optionally, the reaction can be carried out using mixing conditions to effect shearing and grafting of the ethylene copolymers as described in U.S. Pat. No. 5,075,383, incorporated herein by reference. The processing equipment is generally purged with nitrogen to prevent oxidation of the polymer and to aid in venting unreacted reagents and byproducts of the grafting reaction. The residence time in the processing equipment is sufficient to provide for the desired degree of acylation and to allow for purification of the acylated copolymer via venting. Optionally, mineral or synthetic lubricating oil can be added to the processing equipment after the venting stage to dissolve the acylated copolymer.

The free-radical initiators that can be used to graft the ethylenically unsaturated carboxylic acid material to the polymer backbone include peroxides, hydroperoxides, peresters, and azo compounds, preferably those that have a boiling point greater than 100° C. and that thermally decompose to provide free radicals within the grafting temperature range. Representative free-radical initiators include azobutyronitrile, dicumyl peroxide, 2,5-dimethylhexane-2,5-bis-tertiarybutyl peroxide, and 2,5-dimethylhex-3-yne-2,5-bis-tertiary-butyl peroxide.

Other methods known in the art for effecting reaction of ethylene-olefin copolymers with ethylenically unsaturated carboxylic reagents, such as halogenation reactions, thermal, or "ene" reactions, or mixtures thereof, can be used instead of the free-radical grafting process. Such reactions are conveniently carried out in mineral oil or bulk by heating the reactants at temperatures of from about 250° to about 400° C. under an inert atmosphere to avoid the generation of free radicals and oxidation byproducts. "Ene" reactions are a preferred method of grafting when the ethylene-olefin copolymer contains unsaturation. To achieve graft levels of from about 0.05 to about 0.4 carboxylic groups per 1000 $M_n$, it may be necessary to follow or precede the "ene" or thermal graft reaction with a free radical graft reaction.

The reaction between the carboxylic acid material bound to a substantially linear polymer, copolymer, or terpolymer and the compounds of the present invention is conducted by heating a solution of the polymer substrate under inert conditions and then adding the hydrazide compound to the heated Solution, generally with mixing to effect the reaction. It is convenient to employ an oil solution of the polymer substrate heated to 100° to 175° C., while maintaining the solution under an inert atmosphere or a nitrogen blanket. The hydrazide compound is added to this solution and the reaction is effected under the noted conditions. The hydrazide compound can be added in one of two ways—neat or in a solution of suitable carrier solvent capable of delivering said compound into the reaction vessel, such as oil, toluene, or dinonyl phenol.

As disclosed in U.S. Pat. No. 4,990,274, it is possible to reduce the bulk viscosity of a mixture of graft and derivatized polymer in mineral oil with the addition of a minor amount of co-solvent such as an ethoxylated alcohol, polypropylene glycol, or adipate diester. It has now been discovered that the addition of an alkyl phenol also has the benefit of reducing the bulk viscosity of the finished product. The co-solvent may be added prior to, with, or following the addition of the acid amide compound. In addition, this effect is evident regardless of what the derivatizing agent is. Examples of other derivatizing agents are polyamines, hydroxylamines, or polyols. Particularly useful polyamines are those having from 2 to 20 carbon atoms and 2 to 5 nitrogen atoms in the molecule where only one nitrogen atom is a primary nitrogen atom and all the rest are tertiary nitrogen atoms or highly hindered secondary nitrogen atoms. The class of suitable polyamines includes: hydrocarbyl polyamines including alkyl, aryl and mixed alkaryl polyamines, which may contain additional groups, such as hydroxy, oxyamide and imidazoline groups, N-phenyl-phenylenediamine, N-amino alkyl imidazole, or N-amino alkyl morpholine. Useful hydroxylamines are those hydroxylamines having from 2 to 20 carbon atoms, 1 to 4 hydroxy groups and 1 to 5 nitrogen atoms. Typical hydroxylamines include: diethanolamine, di-propanolamine, tris-hydroxymethyl amino-methane and 2-amino-2-ethyl-1,3-propanediol. Useful polyols for the derivatization reaction are the polyols having from 2 to 20 carbon atoms and having from 2 to 5 hydroxyl groups. Typical polyols include glycerol and alkylene glycols, such as dipropylene glycol and pentaerythritol.

The novel grafted polymers of the invention are useful as additives for lubricating oils. They are multi-functional additives for lubricants being effective to provide dispersancy, viscosity index improvement, and anti-oxidant properties to lubricating oils. They can be employed in a variety of oils of lubricating viscosity, including natural and synthetic lubricating oils and mixtures thereof. The novel additives can be employed in crankcase lubricating oils for spark-ignited and compression-ignited internal combustion engines. The compositions can also be used in gas engines, or turbines, automatic transmission fluids, gear lubricants, metal-working lubricants, hydraulic fluids, and other lubricating oil and grease compositions. Their use in motor fuel compositions is also contemplated.

For certain applications, such as single grade lubricating oils, it may be desirable to reduce the molecular weight of the polymers. The reduction of the molecular weight of the starting ethylene copolymer having a molecular weight above 80,000 to a molecular weight ranging from 5,500 to 80,000 and the grafting of the ethylenically unsaturated carboxylic acid material onto the copolymer may be accomplished simultaneously or it may be accomplished sequentially in any order. If done sequentially, the ethylene copolymer can first be degraded to the prescribed molecular weight and then grafted or, conversely, the grafting can be effected onto the high molecular weight copolymer and the resulting high molecular weight grafted copolymer then reduced in molecular weight. Alternatively, grafting and reduction of the high molecular weight copolymer can be done simultaneously.

Reduction of the molecular weight of the high molecular weight ethylene copolymer to the prescribed molecular weight range is conducted in the absence of a solvent or in the presence of a base oil, using a mechanical shearing means. Generally, the ethylene copolymer is heated to a molten condition at a temperature in the range of 250° C. to 450° C. and it is then subjected to mechanical shearing means until the copolymer is reduced to the prescribed molecular weight range. The shearing may be effected by forcing the molten copolymer through fine orifices under pressure or by other mechanical means.

The additives of this invention can be used in combination with other additives typically found in lubricating oils, and such combinations may, in fact, provide synergistic effects toward improving desired properties, such as improved deposit control, anti-wear, frictional, antioxidant, low temperature, and like properties, to the lubricating oil. The typical additives found in lubricating oils are dispersants, detergents, rust inhibitors, antioxidants, antiwear agents, antifoamants, friction modifiers, seal swell agents, demulsifiers, VI improvers, and pour point depressants. See, e.g., U.S. Pat. No. 5,498,809 for a description of useful lubricating oil composition additives. Examples of dispersants include polyisobutylene succinimides, polyisobutylene succinate esters, Mannich Base ashless dispersants, and the like. Examples of detergents include metallic alkyl phenates, sulfurized metallic alkyl phenates, metallic alkyl sulfonates, metallic alkyl salicylates, and the like. Examples of antioxidant additives that can be used in combination with the additives of the present invention include alkylated diphenylamines, N-alkylated phenylendiamines, hindered phenolics, alkylated hydroquinones, hydroxylated thiodiphenyl ethers, alkylidenebispheniols, oil soluble copper compounds, and the like. Examples of anti-wear additives that can be used in combination with the additives of the present invention include organo borates, organo phosphites, organic sulfur-containing, compounds, zinc dialkyl dithiophosphates, zinc diaryl dithiophosphates, phosphosulfurized hydrocarbons, and the like. Examples of friction modifiers that can be used in combination with the novel additives of the present invention include fatty acid esters and amides, organo molybdenum compounds, molybdenum dialkylthiocarbamates, molybdenum dialkyl dithiophosphates, and the like. An example of an antifoamant is polysiloxane, and the like. An example of a rust inhibitor is polyoxyalkylene polyols, and the like. Examples of VI improvers include olefin copolymers and dispersant olefin copolymers, and the like. An example of a pour point depressant is polymethacrylate, and the like.

In general, the finished dispersant product composition should contain from 10 to 50% active derivatized polymer, preferably 20-40 weight percent. A dispersant inhibitor (DI) package concentrate (containing other additives that may be blended into a fully formulated lubricating oil) that this dispersant may be blended into, may contain from 1 to 50 weight percent of this dispersant product, preferably 10 to 30 weight percent. A finished crankcase motor oil formulation may contain this dispersant product (via a DI package or added directly) in an amount ranging from 0.1 to 15 weight percent, or preferably from 0.5 to 5 weight percent. Compositions, when containing these additives, typically are blended into the base oil in amounts that are effective to provide their normal attendant function. Representative effective amounts of such additives are illustrated as follows:

| Compositions | Broad Wt % | Preferred Wt % |
|---|---|---|
| V.I. Improver | 1-12 | 1-4 |
| Corrosion Inhibitor | 0.01-3 | 0.01-1.5 |
| Oxidation Inhibitor | 0.01-5 | 0.01-1.5 |
| Dispersant | 0.1-10 | 0.1-5 |
| Lube Oil Flow Improver | 0.01-2 | 0.01-1.5 |
| Detergents and Rust Inhibitors | 0.01-6 | 0.01-3 |
| Pour Point Depressant | 0.01-1.5 | 0.01-0.5 |
| Anti-Foaming Agents | 0.001-0.1 | 0.001-0.01 |
| Antiwear Agents | 0.001-5 | 0.001-1.5 |
| Seal Swellant | 0.1-8 | 0.1-4 |
| Friction Modifiers | 0.01-3 | 0.01-1.5 |
| Lubricating Base Oil | Balance | Balance |

When other additives are employed, it may be desirable, although not necessary, to prepare additive concentrates comprising concentrated solutions or dispersions of the subject additives of this invention (in concentrate amounts hereinabove described), together with one or more of said other additives (said concentrate when constituting an additive mixture being referred to herein as an additive-package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive-package will typically be formulated to contain the additives in proper amounts to provide the desired concentration in the final formulation when the additive-package is combined with a predetermined amount of base lubricant. Thus, the subject additives of the present invention can be added to small amounts of base oil or other compatible solvents along with other desirable additives to form additive-packages containing active ingredients in collective amounts of typically from about 2.5 to about 90%, and preferably from about 15 to about 75%, and most preferably from about 25 to about 60% by weight additives in the appropriate proportions with the remainder being base oil. The final formulations may employ typically about 1-20 wt. % of the additive-package with the remainder being base oil.

Oil concentrates of the additives may contain from about 1 to 50 weight percent of the additive reaction product in a carrier or diluent oil of lubricating oil viscosity. If desired, the bulk viscosity of the oil concentrate can be reduced by mixing a minor amount of a co-solvent with the concentrate, as disclosed in U.S. Pat. No. 4,990,274.

All of the weight percents expressed herein (unless otherwise indicated) are based on active ingredient (AI) content of the additive, and/or upon the total weight of any additive-package or formulation, which will be the sum of the (AI) weight of each additive plus the weight of total oil or diluent.

In general, the lubricant compositions of the invention contain the additives in a concentration ranging from about 0.01 to about 30 weight percent. A concentration range for the additives ranging from about 0.0 1 to about 10 weight percent based on the total weight of the oil composition is preferred. A preferred concentration range is from about 0.2 to about 5 weight percent. Oil concentrates of the additives can contain from about 1 to about 75 weight percent of the additive reaction product in a carrier or diluent oil of lubricating oil viscosity.

In general, the additives of the present invention are useful in a variety of lubricating oil basestocks. The lubricating oil basestock is any natural or synthetic lubricating base oil stock fraction having a kinematic viscosity at 100° C. of about 2 to 200 cSt, more preferably about 3 to 150 cSt, most preferably about 3 to 100 cSt. The lubricating oil basestock can be derived from natural lubricating oils, synthetic lubricating oils, or mixtures thereof. Suitable lubricating oil basestocks include basestocks obtained by isomerization of synthetic wax and wax, as well as hydrocrackate basestocks produced by hydrocracking (rather than solvent extracting) the aromatic and polar components of the crude. Natural lubricating oils include animal oils, vegetable oils (e.g., rapeseed oils, castor oils and lard oil), petroleum oils, mineral oils, and oils derived from coal or shale.

Synthetic oils include hydrocarbon oils and halo-substituted hydrocarbon oils, such as polymerized and interpolymerized olefins, alkylbenzenes, polyphenyls, alkylated diphenyl ethers, alkylated diphenyl ethers, aklylated diphenyl sulfides, as well as their derivatives, analogs, and homologs thereof and the like. Synthetic lubricating oils also include alkylene oxide polymers, interpolymers, copolymers and derivatives thereof wherein the terminal hydroxyl groups have been modified by esterification, etherification, etc. Another suitable class of synthetic lubricating oils comprises the esters of dicarboxylic acids with a variety of alcohols. Esters useful as synthetic oils also include those made from $C_5$ to $C_{12}$ monocarboxylic acids and polyols and polyol ethers.

Silicon-based oils (such as the polyalkyl-, polyaryl-, polyalkoxy-, or polyaryloxy-siloxane oils and silicate oils) comprise another useful class of synthetic lubricating oils. Other synthetic lubricating oils include liquid esters of phosphorus-containing acids, polymeric tetrahydrofurans, polyalphaolefins, and the like.

The lubricating oil may be derived from unrefined, refined, rerefined oils, or mixtures thereof. Unrefined oils are obtained directly from a natural source or synthetic source (e.g., coal, shale, or tar and bitumen) without further purification or treatment. Examples of unrefined oils include a shale oil obtained directly from a retorting operation, a petroleum oil obtained directly from distillation, or an ester oil obtained directly from an esterification process, each of which is then used without further treatment. Refined oils are similar to the unrefined oils except that refined oils have been treated in one or more purification steps to improve one or more properties. Suitable purification techniques include distillation, hydrotreating, dewaxing, solvent extraction, acid or base extraction, filtration, and percolation, all of which are known to those skilled in the art. Rerefined oils are obtained by treating refined oils in processes similar to those used to obtain the refined oils. These rerefined oils are also known as reclaimed or reprocessed oils and often are additionally processed by techniques for removal of spent additives and oil breakdown products.

Lubricating oil base stocks derived from the hydroisomerization of wax may also be used, either alone or in combination with the aforesaid natural and/or synthetic base stocks. Such wax isomerate oil is produced by the hydroisomerization of natural or synthetic waxes or mixtures thereof over a hydroisomerization catalyst. Natural waxes are typically the slack waxes recovered by the solvent dewaxing of mineral oils; synthetic waxes are typically the wax produced by the Fischer-Tropsch process. The resulting isomerate product is typically subjected to solvent dewaxing and fractionation to recover various fractions of specific viscosity range. Wax isomerate is also characterized by possessing very high viscosity indices, generally having a VI of at least 130, preferably at least 135 and higher and, following dewaxing, a pour point of about −20° C. and lower.

The additives of the present invention are especially useful as components in many different lubricating oil compositions. The additives can be included in a variety of oils with lubricating viscosity including natural and synthetic lubricating oils and mixtures thereof. The additives can be included in crankcase lubricating oils for spark-ignited and compression-ignited internal combustion engines. The compositions can also be used in gas engine lubricants, turbine lubricants, automatic transmission fluids, gear lubricants, compressor lubricants, metal-working lubricants, hydraulic fluids, and other lubricating oil and grease compositions. The additives can also be used in motor fuel compositions.

The advantages and the important features of the present invention will be more apparent from the following examples.

EXAMPLES

Preparation of Hydrazide Monomers

Example 1

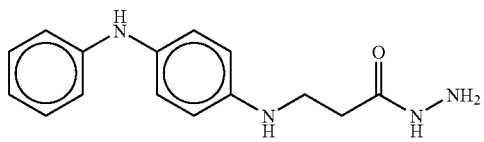

In the first step, to a 500 mL round bottom flask equipped with mechanical stirring, temperature control, nitrogen blanket, reflux condenser, addition funnel, and 0.67 mole of N-phenyl phenylenediamine was added to 9.6 weight percent of acid-leached bentonite clay (Filtrol 20×). The reaction mass was heated to 130° C. and the addition funnel was charged with 0.7 mole of butyl acrylate. At this temperature the butyl acrylate was added drop-wise over two hours and the temperature was maintained for an additional 3 hours. The temperature was then raised to 135° C. and an additional 0.23 mole of butyl acrylate was added through the addition funnel over about 30 minutes. The temperature was then maintained for an additional 2 hours. The reaction mass was cooled to 75° C. and filtered through a preheated bed of Celite. The filtered liquid was taken up in 500 mL of cyclohexane and allowed to precipitate. The precipitated material was then re-crystallized from 98:2 cyclohexane:isopropanol. A second crop of product was obtained from the filtered solution with an overall yield of 60%.

In the second step, a 250 mL round bottom flask equipped with mechanical stirring, temperature control, nitrogen blanket, and reflux condenser was charged with 100 grams of material made in the first step and 50 mL of isopropanol. This was heated to 55° C., at which time 0.47 mole of hydrazine hydrate was added to the reaction mass, followed by heating to 65° C. After 21 hours a pink colored solid had precipitated. This material was isolated and recrystallized from ~500 mL of isopropanol to afford the product as a fine white powder in 82% yield. LCMS indicates the major component is 270 MW, the same as the desired compound.

Example 2

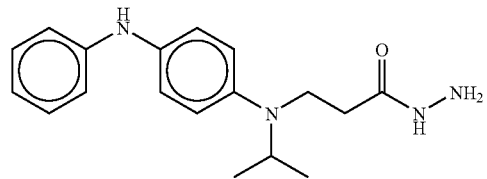

In the first step, to a 250 mL round bottom flask equipped with mechanical stirring, temperature control, nitrogen blanket, and reflux condenser, 0.41 mole of N-isopropyl-N-phenyl phenylenediamine (Flexzone 3C, Crompton Corporation) was added to 1.09 moles of butyl acrylate. The reaction mass was heated to 35° C. and 10.6 weight percent of acid-leached bentonite clay (Filtrol 20×) was charged. The temperature was then raised to 142° C. and maintained there for 66 hours. The reaction mass was cooled to 75° C. and filtered through a preheated bed of Celite. The filtered liquid was vacuum distilled at 60° C. to a pressure of 4 mm Hg to remove unreacted butyl acetate. One hundred and sixteen grams of solid was obtained.

In the second step, a 250 mL round bottom flask equipped with mechanical stirring, temperature control, nitrogen blanket, and reflux condenser was charged with 150 grams of the material made by the first step and 75 mL of isopropanol. Hydrazine monohydrate (0.3 mole) was then charged and the reaction mass was heated to 65° C. After 17 hours an additional 0.14 mole of hydrazine monohydrate was added and the temperature was raised to 70° C. Following an additional 24 hours, an additional 0.2 mole of hydrazine was charged and the temperature was elevated to 80° C. After an additional 48 hours the reaction mass was cooled, taken up in 600 mL of cyclohexane, and the bottom layer was taken off. This was washed with 400 mL of cyclohexane followed by an additional 200 mL of cyclohexane. The bottom layer was dissolved in 200 mL of hot toluene followed by 50-100 mL of diethyl ether added dropwise until a white precipitate began to form. On standing, a white to pink solid precipitated. This was filtered to afford 40 grams of a white solid. Twenty grams of this material was purified by column chromatography to afford the product as a fine white powder with 90% purity. LCMS indicates the major component is 312 MW, the same as the desired compound. $^1$H NMR: $\delta$=1.08 ppm Integral=6 (—CH—(CH$_2$)$_2$; $\delta$=2.22 ppm Integral=2 (—NH—CH$_2$—CH$_2$—CO—); $\delta$=3.32 ppm Integral=2 (—NH—CH$_2$—CH$_2$—CO—); $\delta$=3.84 ppm Integral=1 (—CH—CH$_2$)$_2$); $\delta$=4.18 ppm Integral=2 (—NH—NH$_2$); $\delta$=6.63 to 7.15 ppm Integral=5 (aromatic); $\delta$=7.64 ppm Integral=1 (Ph—NH—Ph—); $\delta$=9.01 ppm Integral=1 (—NH—NH$_2$).

Example 3

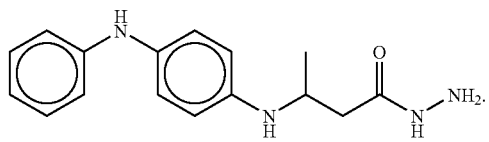

In the first step, an autoclave was charged with 1 mole of N-phenyl phenylenediamine, 1.21 moles of methyl acetoacetate, 157 grams of isopropanol, and 6.2 grams dry equivalent of platinum sulfide on carbon. The autoclave was purged with nitrogen followed by hydrogen, then pressurized to 700 PSI with nitrogen and heated to a maximum of 85° C. in 30 minutes and held there for two hours. The reaction mass was then cooled, removed with additional isopropanol, and filtered.

In the second step, a 5 liter round bottom flask equipped with mechanical stirring, temperature control, nitrogen blanket, and reflux condenser was charged with 501 grams of the material made in the first step (~50% in isopropaniol). At room temperature 1.02 moles of hydrazine monohydrate was added to the reaction mass, whereupon an exotherm of ~15° C. over 10 minutes was observed. The reaction mass was then heated to 70° C. and held there for 3 hours, followed by heating to 80° C. and holding for an additional 2 hours. At this point the reaction was heated to 85° C. and held at this temperature for an additional 3 hours. The reaction mass was cooled back to 80° C. and 1 liter of ethanol was added. The reaction mass was transferred to a 4 liter Erlenmeyer flask containing ~1700 mL of isopropanol at which time a precipitate formed. The flask was heated until all the precipitate went back into solution and this was allowed to cool slowly. A grey to white solid precipitated and was isolated by filtration. Second and third crops were obtained from the mother liquor; these were re-crystallized a second time. The overall yield for this process was ~79%.

Use of Hydrazide Monomers

Example 4

Structural Confirmation of Succinic Hydrazide

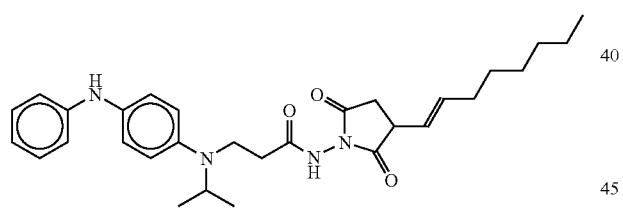

A 50 mL round bottom flask equipped with magnetic stirring, nitrogen blanket, reflux condenser, and temperature control was charged with 30 mL of toluene and 0.66 gram of the product of Example 2. The temperature was raised to 70° C. and 0.31 mole of octenyl succinic anhydride was charged as a mixture with 2 mL of toluene. The reaction mass was then brought to reflux (~112° C.) and held there for 2 hours. It was then cooled and concentrated on a rotary evaporator and purified by column chromatography to afford a viscous yellow liquid following removal of solvent. FTIR: 3366 cm$^{-1}$ weak (N—H band); 3253 cm$^{-1}$ weak (N—H band); 1788 cm$^{-1}$ weak and 1729 cm$^{-1}$ very strong (succinimide hydrazide); 1695 cm$^{-1}$ strong shoulder (hydrazide); 1595 cm$^{-1}$ strong (aromatic). LCMS indicates the major component is 504 MW, the same as the desired compound.

In the following Examples 5, 6, and 7, a maleated polymer in oil was employed that was prepared as described in WO 03/025034. That preparation is as follows.

Grafting solvent media were added to 375 grams of ethylene-propylene copolymer (EP) (in which the polymer substrate comprised about 57 mole percent ethylene and 43 mole percent propylene having a number average molecular weight of about 20,000), in a one to three ratio (solvent to polymer), and heated to about 180° C. with stirring, under a nitrogen blanket, until the EP was dissolved. Maleic anhydride was added, as a thirty percent concentrate in a carrier solvent, at a rate of 0.604 gram/min over one hour. Peroxide catalyst (di-t-butyl peroxide) was added concurrently in a ratio of 2.43 with respect to the maleic anhydride to be added. After the additions were completed, the reaction mass was post-reacted for a period of time sufficient to ensure the decomposition of all peroxide. This was followed by vacuum stripping, with a nitrogen sparge to remove residual maleic anhydride. After the grafting reaction was completed, there was added a. sufficient amount of solvent neutral 100 (SN100), a. paraffinic mineral oil, to bring the polymer content to 50% to facilitate handling.

Example 5

Dispersant/AO/VI/MD

A 250 mL round bottom flask equipped with mechanical stirring, temperature control, and nitrogen blanket was charged with 62.5 grams of maleated polymer in oil (prepared as described in WO 03/025034) and an equal amount of SN-100 mineral oil. This was heated to 160° C. and held there for one hour. The reaction mass was then cooled to 120° C. whereupon the anhydride was neutralized with 2.89 grams of the hydrazide from Example 2. After 30 minutes the temperature was again raised to 160° C. for 4 hours to drive off water generated during the reaction. The product was then cooled and filtered through a 100-mesh screen. FTIR: 1789 cm$^{-1}$ weak and 1737 cm$^{-1}$ shoulder (succinimide hydrazide); 1721 cm$^{-1}$ shoulder (hydrazide); 1595 cm$^{-1}$ weak (aromatic).

Example 6

Dispersant/AO/VI/MD

A 250 mL round bottom flask equipped with mechanical stirring, temperature control, and nitrogen blanket was charged with 62.5 grams of maleated polymer in oil (prepared as described in WO 03/025034) and an equal amount of SN-100 mineral oil. This was heated to 160° C. and held there for one hour. The reaction mass was then cooled to 110° C. whereupon the anhydride was neutralized with 2.62 grains of the hydrazide from Example 3. After 30 minutes the temperature was again raised to 160° C. for 4 hours to drive off water generated during the reaction. The product was then cooled and filtered through a 100-mesh screen.

Example 7

Dispersant/AO/VI/MD

A 250 mL round bottom flask equipped with mechanical stirring, temperature control, and nitrogen blanket was charged with 62.5 grams of maleated polymer in oil (prepared as described in WO 03/025034) and 57.5 grains of SN-100 mineral oil. This was heated to 160° C. and held there for one hour. The reaction mass was then cooled to 110° C. whereupon the anhydride was neutralized with 2.62 (grams of the hydrazide from Example 3. After 30 minutes the temperature was again raised to 160° C. for 2.5 hours to drive off water generated during the reaction. In order to reduce the bulk viscosity of the final product (as per U.S. patent application Publication No. 2003/00330033), 5 grams of dinonyl phenol was added to the reaction mass and mixed for an additional 1 hour. The product was then cooled and filtered through a 100-mesh screen.

Oxidation Test

Pressure Differential Scanning Calorimetry Test

The antioxidant properties of the reaction products were determined by the Pressure Differential Scanning Calorimetry (PDSC) Test. Testing was performed using the Mettler-Toledo DSC27HP, following outlined procedures. This test measures the relative Oxidation Induction Time (OIT) of antioxidants in lubricating fluids as measured in $O_2$ gas under pressure.

The sample to be tested was blended into a model fully-formulated motor oil (see Table 1), which did not contain antioxidant, at 1% and 10% by weight along with 50 ppm ferric naphthenate. These were then compared to a sample of the base blend and 50 ppm ferric naphthenate. The conditions for the test are shown in Table 2. In Table 3 the numerical value of the test results (OIT, min.) increases with an increase in effectiveness.

TABLE 1

Base Blend for PDSC Test

| Component | Weight Percent |
| --- | --- |
| Solvent Neutral 150 | 83.85 |
| Zinc dialkyldithiophosphate | 1.01 |
| Antioxidant | 0.0 |
| Succinimide Dispersant | 7.58 |
| Overbased Calcium Sulfonate Detergent | 1.31 |
| Neutral Calcium Sulfonate Detergent | 0.5 |
| Rust Inhibitor | 0.1 |
| Pour Point Depressant | 0.1 |
| OCP VI Improver | 5.55 |

TABLE 2

PDSC Conditions

| Conditions | Setting |
| --- | --- |
| Temperature | 175° C. |
| Gas | Oxygen |
| Flow Rate | 100 mL/min. |
| Pressure | 500 psi |
| Sample Size | 1-5 mg |
| Pan (open/closed) | Open |

TABLE 3

PDSC Results

| Example | Description | OIT |
| --- | --- | --- |
| 8 | Base Blend | 44.62 |
| 9 | Base Blend with 1 wt % Example 5 | 45.42 |
| 10 | Base Blend with 10 wt % Example 5 | 68.22 |
| 11 | Base Blend with 1 wt % Example 6 | 45.90 |
| 12 | Base Blend with 10 wt % Example 6 | 75.05 |

The activites seen in Examples 10 and 12 are cases where the oil being tested contains only 0.2 wt % of the active monomer.

Oxidation Test

Oxidation Stability of Steam Turbine Oils by Rotating Bomb

The antioxidant and metal deactivator properties of the novel reaction products were determined in the Rotating Bomb Oxidation Test (RBOT). Testing was performed following ASTM D 2272, in a Koehler Instrument Company, Inc., Rotary Bomb Oxidation Bath (Model K-70200) fitted with the Koehler Model K-70502 pressure measurement system. This test measures the relative Oxidation Induction Time (OIT) of antioxidants in lubricating fluids as measured by the drop in pressure of a vessel pressurized with $O_2$ gas.

Each sample to be tested was formulated into a model steam-turbine oil (see Table 4). Table 5 defines the various formulations tested, while Table 6 provides the numerical value of the test results (OIT, min.) where an increase in numerical value translates to an increase in effectiveness.

TABLE 4

Formulation for RBOT

| Component | Weight Percent |
| --- | --- |
| Excel 100 | 90 |
| Metal Deactivator (Irgamet 39) | X |
| Corrosion Inhibitor | 0.1 |
| Aminic Antioxidant (Naugalube ® 438L) | Y |
| Example | Z |

Excel 100 refers to base oil obtained from ExxonMobil.

TABLE 5

Additive concentration

| Example | Description | X | Y | Z |
| --- | --- | --- | --- | --- |
| 13 | Blank | 0 | 0 | 0 |
| 14 | Example 6 alone at 0.15 wt % | 0 | 0 | 0.15 |
| 15 | Example 6 alone at 1 wt % | 0 | 0 | 1 |
| 16 | Example 6 alone at 2 wt % | 0 | 0 | 2 |
| 17 | Example 6 alone at 10 wt % | 0 | 0 | 10 |
| 18 | Example 6 at 2 wt % with 0.125 wt % 438-L | 0 | 0.125 | 2 |
| 19 | Example 1 alone at 0.025 wt % | 0 | 0 | 0.025 |
| 20 | Example 2 alone at 0.025 wt % | 0 | 0 | 0.025 |
| 21 | Example 3 alone at 0.025 wt % | 0 | 0 | 0.025 |
| 22 | Example 1 at 0.025 wt % with 0.125 wt % 438L | 0 | 0.125 | 0.025 |
| 23 | Example 2 at 0.025 wt % with 0.125 wt % 438L | 0 | 0.125 | 0.025 |
| 24 | Example 3 at 0.025 wt % with 0.125 wt % 438L | 0 | 0.125 | 0.025 |
| Ref. A | 438L alone at 0.02 wt % | 0 | 0.02 | 0 |
| Ref. B | 438L alone at 0.04 wt % | 0 | 0.04 | 0 |
| Ref. C | 438L alone at 0.2 wt % | 0 | 0.2 | 0 |
| Ref. D | 438L alone at 0.125 wt % | 0 | 0.125 | 0 |
| Ref. E | Irgamet 39 alone at 0.025 wt % | 0.025 | 0 | 0 |
| Ref. F | Irgamet 39 at 0.025 wt % with 0.125 wt % 438L | 0.025 | 0.125 | 0 |

TABLE 6

RBOT results

| Example | OIT |
| --- | --- |
| 13 | 23 |
| 14 | 34.5 |
| 15 | 54 |

TABLE 6-continued

RBOT results

| Example | OIT |
|---|---|
| 16 | 72 |
| 17 | 463 |
| 18 | 483 |
| 19 | 56 |
| 20 | 69 |
| 21 | 55 |
| 22 | 81 |
| 23 | 99.5 |
| 24 | 78 |
| Reference A | 68 |
| Reference B | 75.5 |
| Reference C | 79.5 |
| Reference D | 80.5 |
| Reference E | 34.7 |
| Reference F | 159.5 |

As demonstrated by the data presented above the additives of this invention exhibit antioxidant activity by themselves and, when used in lesser amounts in combination with a primary antioxidant, they demonstrate what appears to be metal deactivator activity as well. Reference F contains 0.125 wt % of Naugalube 438L and 0.025 wt % of Irgamet 39 (a commercial metal deactivator). The OIT for this sample is under 160 minutes. When the same amount of Naugalube 438L is blended into an oil containing 2 wt % of Example 7 the OIT for the sample is over 480 minutes (Example 18). There is a clear synergy between the additive and the primary antioxidant as, when each of them is used alone, neither comes close to approaching the performance observed when they are used together.

Deposit Control Test

Thermo-Oxidative Engine Oil Simulation Test (TEOST)

TEOST Formulation

The additives were tested for effectiveness in a motor oil formulation (See description in Table 7) and compared to an identical formulations without the novel additives.

TABLE 7

SAE 10W-30 Motor Oil Formulation (Base Blend)

| Common Components | Weight Percent |
|---|---|
| Excel 100 | Balance |
| Hybase C300 | 1.5 |
| Lobase C4506 | 0.5 |
| AW, LZ-1095 | 1.0 |
| PPD, Acryloid 154-70 | 0.1 |
| AO, Naugalube-438L | 0.5 |
| OCP Viscosity Index improver | 5.0 |
| Example 6 | 5.0 |

Hybase C300 is an overbased calcium sulfonate detergent, available from Crompton Corporation.
LoBase C5406 is calcium sulfonate detergent, available from Crompton Corporation.
LZ 1095 is a zinc dialkyl dithiophosphate antiwear additive, available from Lubrizol.
Acryloid is a pour point depressant, available from Rohm & Haas.
Naugaluble 438L is an aminic antioxidant, available from Crompton Corporation.

The Deposit control properties of the above Example 6 were determined in the Thermo-oxidative Engine Oil Simulation Test (TEOST) MHT-4, available from the Tannas Company. The test is used to determine the amount of deposits formed by automotive engine oils and has been shown to correlate to the TU3M Peugeot engine test for deposits.

In this test, a sample of engine oil containing an organometallic catalyst is forced to flow down the outside of a tared depositor rod in a glass-mantled casing. The rod is resistively heated to a constant temperature of 285° C. for 24 hours. During this time, dry air is forced to flow through the mantle chamber at a rate of 10 mL/min. At the end of the test, the rod is rinsed of oil residue and dried to obtain a gross mass. The solvent used for rinsing is passed through a tared filter. The mass of deposits on the rod and filter is the total deposit mass. Performance is measured as total deposit mass in milligrams with results typically between 1 and 150. The lower the number versus the reference, the better the performance of the oil formulation. Table 8 lists the parameters for the TEOST as performed, with results for the graft and derivatized polymer in mineral oil samples (Examples 25 and 26) found in

TABLE 8

TEOST Parameters

| Conditions | Setting |
|---|---|
| Rod Temperature | 285° C. |
| Oil Pump Setting | 247 |
| Oil Volume | 8.4 grams |
| Dry Air Flow Rate | 10 mL/minute |
| Catalyst (Tannas Part 5953) | 0.1 gram |

TABLE 9

TEOST Results

| Example | Description | mg deposits | % deposit decrease |
|---|---|---|---|
| 25 | Base Blend* | 144.1 | — |
| 26 | Base Blend* with Example 7 | 40.6 | 72 |

*Note: Base Blend refers to the formulation in Table 7.

It is seen that by using the additives of this invention it is possible to reduce dramatically the deposit forming tendencies of an oil.

Physical Properties

Kinematic Viscosity/Hunter Colorimeter Haze Test

The kinematic viscosity of Examples 7 and 8 were measured. Kinematic viscosity was measured at 210° F. (approx. 99° C.) and is reported in Centistokes.

| Example | Description | Viscosity |
|---|---|---|
| 27 | Example 6 | 1779 |
| 28 | Example 7 | 1434 |

As can be seen, using the alkyl phenol in Example 7 reduced the bulk viscosity by nearly 20% as compared to Example 6.

The invention has been described in detail with particular reference to preferred embodiments thereof, but it is understood that variations and modifications can be effected within the spirit and scope of the invention.

What is claimed is:

1. A composition of matter comprising a hydrazide compound of the formula:

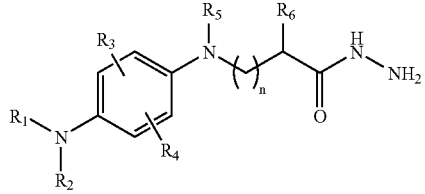

wherein:
R$_1$ is selected from the group consisting of alkyl, alkyl ether, and phenyl;
R$_2$, R$_3$, R$_4$, R$_5$, and R$_6$ are independently selected from the group consisting of hydrogen, alkyl, alkyl ether, and aryl; and
n is an integer of from 0 to 10;
and wherein:
when R$_1$ is phenyl, it is of the structure:

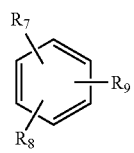

wherein R$_7$, R$_8$, and R$_9$ are independently selected from the group consisting of hydrogen, alkyl, alkyl ether, and aryl, or R$_7$ can be combined with R$_8$ to form a ring of 5 or 6 carbon atoms.

2. The composition of claim 1 wherein the hydrazide compound is of the structure:

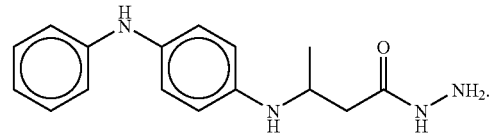

3. The composition of claim 1 wherein the hydrazide compound is of the structure:

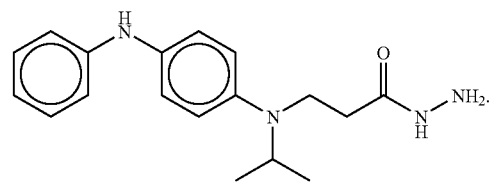

4. The composition of claim 1 wherein the hydrazide compound is of the structure:

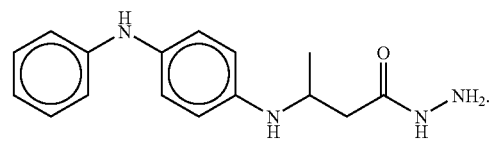

* * * * *